(12) United States Patent
Thyagarajan et al.

(10) Patent No.: US 10,044,310 B2
(45) Date of Patent: Aug. 7, 2018

(54) METHODS OF AUTO TUNING MACHINE PARAMETERS AND SYSTEMS THEREOF

(71) Applicants: Lav Thyagarajan, West Fargo, ND (US); Long Wu, Fargo, ND (US); Tianjun Fu, Fargo, ND (US)

(72) Inventors: Lav Thyagarajan, West Fargo, ND (US); Long Wu, Fargo, ND (US); Tianjun Fu, Fargo, ND (US)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 14/658,804

(22) Filed: Mar. 16, 2015

(65) Prior Publication Data
US 2016/0276971 A1    Sep. 22, 2016

(51) Int. Cl.
| H02P 23/08 | (2006.01) |
| H02P 21/14 | (2016.01) |
| H02P 25/02 | (2016.01) |
| H02P 23/30 | (2016.01) |

(52) U.S. Cl.
CPC .............. *H02P 23/08* (2013.01); *H02P 21/14* (2013.01); *H02P 23/30* (2016.02); *H02P 25/02* (2013.01)

(58) Field of Classification Search
CPC .......... H02P 23/08; H02P 23/30; H02P 21/14; H02P 25/02
USPC ......................................................... 318/799
See application file for complete search history.

(56) References Cited

U.S. PATENT DOCUMENTS

| 5,032,771 | A | * | 7/1991 | Kerkman | ................ | H02P 21/09 |
| | | | | | | 318/52 |
| 5,334,923 | A | * | 8/1994 | Lorenz | .................... | H02P 6/187 |
| | | | | | | 318/805 |
| 5,477,163 | A | | 12/1995 | Kliman | | |
| 5,754,026 | A | | 5/1998 | Hampo et al. | | |
| 5,796,236 | A | | 8/1998 | Royak | | |
| 6,335,605 | B1 | * | 1/2002 | Negoro | ................... | H02P 21/10 |
| | | | | | | 318/727 |
| 2003/0151385 | A1 | * | 8/2003 | Wu | ......................... | H02P 21/10 |
| | | | | | | 318/727 |
| 2004/0019439 | A1 | | 1/2004 | El-Ibiary | | |
| 2008/0180054 | A1 | | 7/2008 | Kinpara et al. | | |
| 2009/0066281 | A1 | * | 3/2009 | West | ........................ | B60L 3/00 |
| | | | | | | 318/434 |
| 2010/0168920 | A1 | * | 7/2010 | Hooker | ................. | F25D 25/025 |
| | | | | | | 700/275 |
| 2014/0035507 | A1 | * | 2/2014 | Chi | .......................... | H02P 3/18 |
| | | | | | | 318/807 |

(Continued)

OTHER PUBLICATIONS

Mihai Comanescu, et al., "An Improved Flux Observer Based on PLL Frequency Estimator for Sensorless Vector Control of Induction Motors", IEE Transactions on Industrial Electronics, vol. 53, No. 1, Feb. 2006, pp. 50-56.

(Continued)

*Primary Examiner* — Kawing Chan
(74) *Attorney, Agent, or Firm* — Harness, Dickey & Pierce, P.L.C.

(57) ABSTRACT

In one example embodiment, a method includes determining a first adjustment value for a slip frequency of a rotor in an induction motor, determining a second adjustment value for an inductance of the induction motor and tuning the slip frequency of the rotor and the inductance of the induction motor based on the first adjustment value and the second adjustment value, respectively.

10 Claims, 10 Drawing Sheets

(56) References Cited

U.S. PATENT DOCUMENTS

2016/0181961 A1* 6/2016 Holmburg ............... H02P 21/14
                                                318/400.02

OTHER PUBLICATIONS

Search Report for corresponding European Application No. 16159966.7 dated Jul. 27, 2016.

* cited by examiner

Motoring:

| Speed | Wslip Estimated | Wslip Adjust | Speed Sign | Compensate | Wslip Control |
|---|---|---|---|---|---|
| 2000 | 1.87 | 0.02 | 1 | -1.87* (0.02*1) | 1.85 |
| -2000 | -1.87 | 0.02 | -1 | -1.87* (0.02*1) | -1.85 |

Generating:

| Speed | Wslip Estimated | Wslip Adjust | Speed Sign | Compensate | Wslip Control |
|---|---|---|---|---|---|
| 2000 | 1.4 | 0.1 | 1 | -1.4 - (0.1*1) | -1.5 |
| -2000 | -1.4 | 0.1 | -1 | 1.4 - (0.1*-1) | 1.5 |

FIG. 8

Motoring:

| Speed | LM Look up | Lm Adjust | Torque Sign | Compensate | Lm Control |
|---|---|---|---|---|---|
| 2000 | 2.4 | -0.1 | 1 | 2.4 + (-0.1*1) | 2.3 |
| -2000 | 2.4 | 0.1 | -1 | 2.4 + (0.1*1) | 2.3 |

Generating:

| Speed | LM Look up | Lm Adjust | Torque Sign | Compensate | Lm Control |
|---|---|---|---|---|---|
| 2000 | 2.4 | 0.1 | -1 | 2.4 + (0.1*1) | 2.3 |
| -2000 | 2.4 | -0.1 | 1 | 2.4 + (-0.1*1) | 2.3 |

METHODS OF AUTO TUNING MACHINE PARAMETERS AND SYSTEMS THEREOF

FIELD

Example embodiments are related to electric drive device systems and/or methods for controlling electric drive devices.

BACKGROUND

Electric drive devices, such as alternating current (AC) induction motors are used to power systems such as hybrid/electrical vehicles, auxiliary pumps, air compressors, fans, etc. AC induction motors have been widely used for industry applications. A controller for the drive device controls operation of the drive device. The controller produces control signals which are applied to the terminals of the drive device.

Typically, the controller controls the drive device based on a plurality of machine parameters. For vector control of the drive device, a control algorithm implemented on the controller uses machine parameters that are obtained from the manufacturer or from machine characterization. Two examples of machine parameters are a rotor time constant and a magnetizing inductance of the drive device.

During normal operation of the drive device, such machine parameters change from their initial values, which can adversely affect the performance of the drive device.

SUMMARY

Some example embodiments are directed to methods and apparatuses for generating an output variable voltage.

In one example embodiment, a method includes determining a first adjustment value for a slip frequency of a rotor in an induction motor, determining a second adjustment value for an inductance of the induction motor and tuning the slip frequency of the rotor and the inductance of the induction motor based on the first adjustment value and the second adjustment value, respectively.

In one example embodiment, a device includes a memory configured to store computer-readable instructions thereon and a processor. The processor is configured to execute the computer-readable instructions to determine a first adjustment value for a slip frequency of a rotor in an induction motor, determine a second adjustment value for an inductance of the induction motor and tune the slip frequency of the rotor and the inductance of the induction motor based on the first adjustment value and the second adjustment value, respectively.

BRIEF DESCRIPTION OF THE DRAWINGS

Example embodiments will be more clearly understood from the following detailed description taken in conjunction with the accompanying drawings. FIGS. 1-5 represent non-limiting, example embodiments as described herein.

FIG. 1 illustrates a block diagram of FIGS. 1A-1B;

FIG. 2 is a block diagram of an electronic data processing system consistent with FIGS. 1A-1B, according to an example embodiment;

FIG. 4 is a graph illustrating the difference between the determined d-axis/q-axis and the actual d-axis/q-axis positions, according to one example embodiment;

FIG. 5 describes a method for tuning an induction motor's slip frequency in real time, according to one example embodiment;

FIG. 6 illustrates a table of applying the adjustment value of a rotor's slip frequency to the estimated value of the slip frequency, according to one example embodiment;

FIG. 8 illustrates a table of applying the adjustment value of a rotor's magnetizing inductance to the value of the magnetizing inductance, according to one example embodiment.

DETAILED DESCRIPTION

Figure 1A:
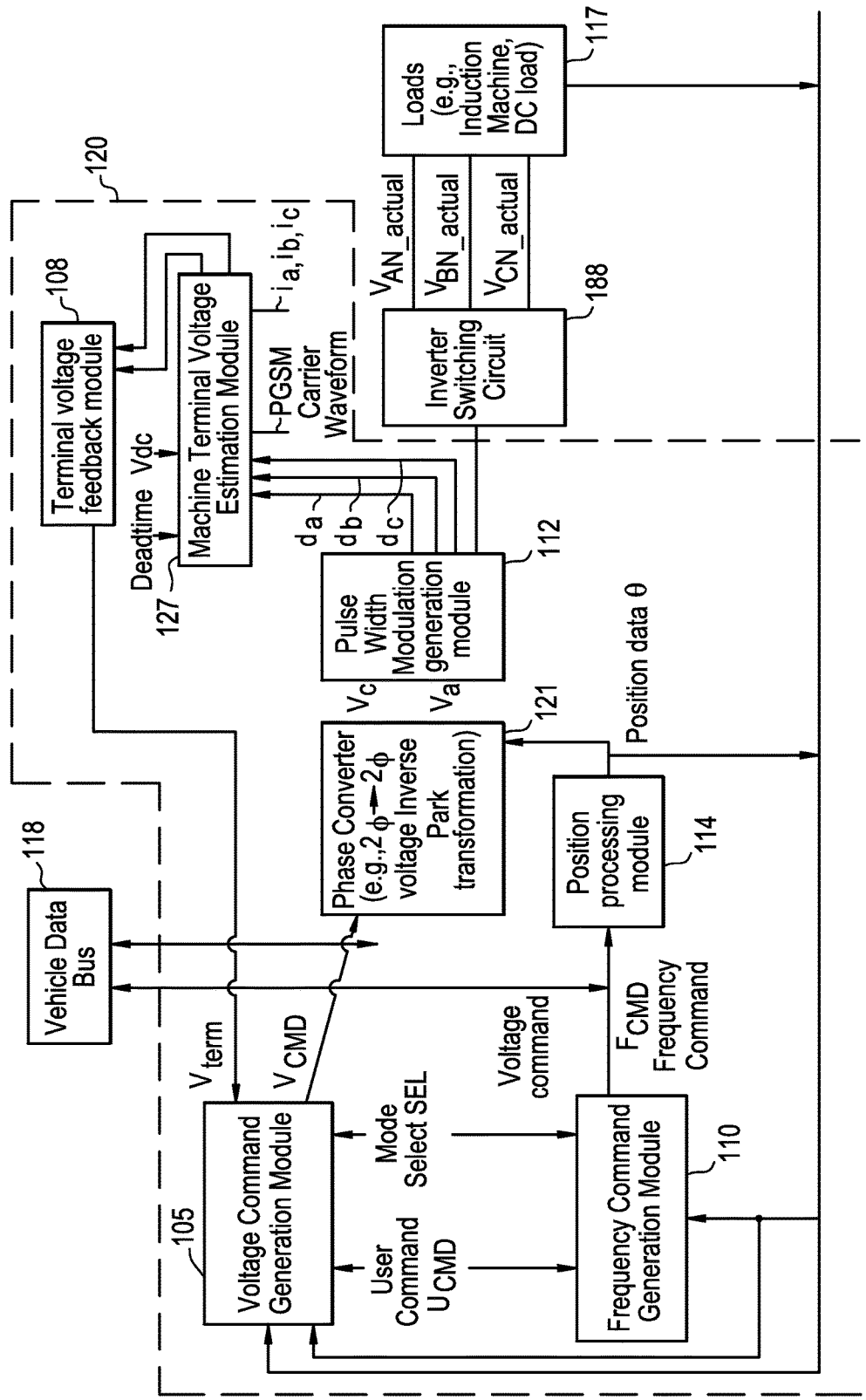
FIGS. 1A-1B is a block diagram of a system for controlling an electrical motor, according to an example embodiment.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be an electronic memory, read only, non-volatile electronic random access memory, one or more electronic data registers, data latches, a magnetic disc drive, a hard disc drive, an optical disc drive, or the like.

In one example embodiment, a method includes determining a first adjustment value for a slip frequency of a rotor in an induction motor, determining a second adjustment value for an inductance of the induction motor and tuning the slip frequency of the rotor and the inductance of the induction motor based on the first adjustment value and the second adjustment value, respectively.

In an example embodiment, the determining steps and the tuning step are performed in real-time.

In an example embodiment, the determining the first adjustment value includes determining a direct-axis voltage of the induction motor using a first method and a second method and determining the first adjustment value based on the direct-axis voltage determined using the first method and the direct-axis voltage determined using the second method.

In an example embodiment, the determining the direct-axis voltage using the first method includes determining the direct-axis voltage as an estimate of a direct-axis terminal voltage command.

In an example embodiment, the determining the direct-axis voltage using the second method includes determining the direct-axis voltage as an observed direct-axis voltage of a stator in the induction motor.

In an example embodiment, the direct-axis voltage of the stator is independent of variations in the slip frequency.

In an example embodiment, when the tuning tunes the first slip frequency by the first adjustment value, a ratio between the direct-axis voltage determined using the first method and the direct-axis voltage determined using the second method, is equal to 1.

In an example embodiment, the determining the second adjustment value includes estimating an electromagnetic torque of the induction motor, and determining the second adjustment value based on the estimated electromagnetic torque of the induction motor and a torque command.

In an example embodiment, the estimating estimates the electromagnetic torque based on at least one of an estimate of a stator flux of the induction motor and a mechanical power and a mechanical speed of the rotor.

In an example embodiment, the method further includes determining a first power loss value in a stator of the induction motor, determining a second power loss value in the rotor, and adjusting a power of the induction motor based on the determined first power loss and the determined second power loss. The estimating estimates the electromagnetic torque based on the adjusted power and the mechanical speed of the rotor.

In an example embodiment, when the tuning tunes the inductance of the induction motor by the second adjustment value, a ratio between the torque command and the estimated electromagnetic torque, is equal to 1.

In an example embodiment, the method includes driving the induction motor based on the tuned slip frequency and the tuned inductance.

In one example embodiment, a device includes a memory configured to store computer-readable instructions thereon and a processor. The processor is configured to execute the computer-readable instructions to determine a first adjustment value for a slip frequency of a rotor in an induction motor, determine a second adjustment value for an inductance of the induction motor and tune the slip frequency of the rotor and the inductance of the induction motor based on the first adjustment value and the second adjustment value, respectively.

In an example embodiment, the processor is configured to determine the first adjustment value and the second adjustment value in real-time, and tune the slip frequency and the inductance of the induction motor in real-time.

In an example embodiment, the processor is configured to determine the first adjustment value by, determining a direct-axis voltage of the induction motor using a first method and a second method, and determining the first adjustment value based on the direct-axis voltage determined using the first method and the direct-axis voltage determined using the second method.

In an example embodiment, the processor is configured to determine the direct-axis voltage using the first method by determining the direct-axis voltage as an estimate of a direct-axis terminal voltage command.

In an example embodiment, the processor is configured to determine the direct-axis voltage using the second method by determining the direct-axis voltage as an observed direct-axis voltage of a stator in the induction motor.

In an example embodiment, the direct-axis voltage of the stator is independent of variations in the slip frequency.

In an example embodiment, when the process tunes the slip frequency by the first adjustment value, a ratio between the direct-axis voltage determined using the first method and the direct-axis voltage determined using the second method, is equal to 1.

In an example embodiment, the processor is configured to determine the second adjustment value by, estimating an electromagnetic torque of the induction motor, and determining the second adjustment value based on the estimated electromagnetic torque of the induction motor and a torque command.

In an example embodiment, the processor is configured to estimate the electromagnetic torque based on at least one of an estimate of a stator flux of the induction motor and a mechanical power and a mechanical speed of the rotor.

In an example embodiment, the processor is further configured to determine a first power loss value in a stator of the induction motor, determine a second power loss value in the rotor, and adjust a power of the induction motor based on the determined first power loss and the determined second power loss. The processor is configured to estimate the electromagnetic torque based on the adjusted power and the mechanical speed of the rotor.

In an example embodiment, when the processor tunes the inductance of the induction motor by the second adjustment value, a ratio between the torque command and the estimated electromagnetic torque, is equal to 1.

Figure 1B:
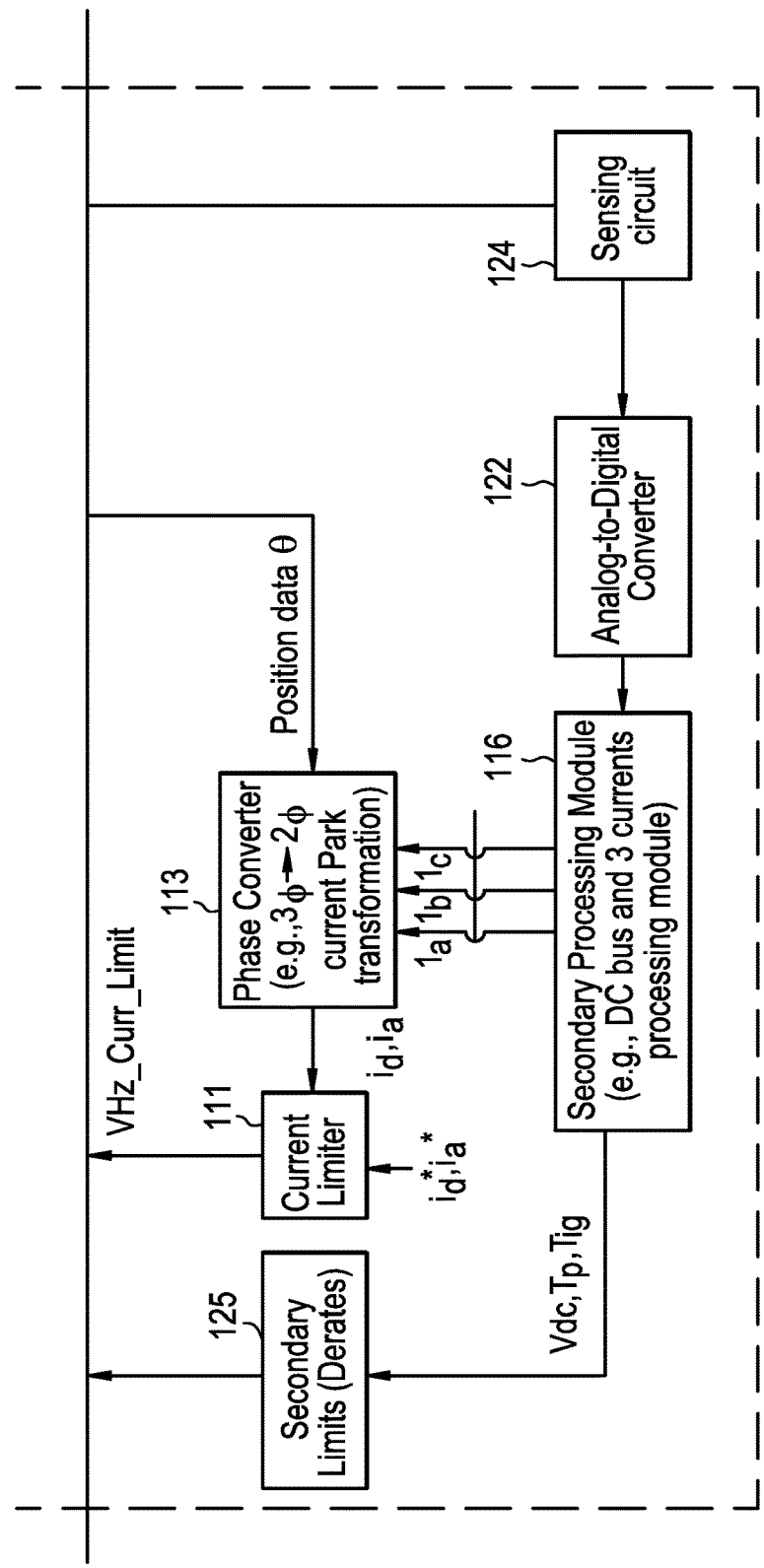

In accordance with an example embodiment, FIGS. 1A-1B illustrate a drive system 100 for controlling a load such as an electric motor (e.g., an AC induction motor). The drive system 100 may be referred to as a control device or a power supply for the load. The drive system 100 is configured to operate in one of two different control modes. One mode is a Vector control or Indirect field oriented control mode which allows for operation of the electric motor in four quadrants with the electric motor being run as an induction generator in one of the voltage control mode, speed control mode or in the torque mode. The other mode is a frequency control mode, which allows the setting of a voltage/frequency (V/Hz) relationship.

The electrical motor may be a motor such as an induction motor (IM) motor, another alternating current machine or a direct current machine. The motor has a nominal dc bus voltage (e.g., 320 Volts). The nominal voltage is a named voltage. For example, a nominal voltage of the motor may be 320 Volts, but the motor may operate at a voltage above and below 320 Volts.

In an example embodiment, the system, aside from the load 117 and an inverter switching circuit 188, may be referred to as a controller.

It should be understood that the drive system 100 may include additional features that are not illustrated in FIGS. 1A-1B. The features shown in FIGS. 1A-1B are illustrated for the convenience of describing the drive system 100 and it should be understood that the drive system 100 should not be limited to the features shown in FIGS. 1A-1B.

The system 100 includes electronic modules, software modules, or both. In an example embodiment, the drive system 100 includes an electronic data processing system 120 to support storing, processing or execution of software instructions of one or more software modules. The electronic data processing system 120 is indicated by the dashed lines in FIG. 1A-1B and is shown in greater detail in FIG. 2. The electronic data processing system 120 may also be referred to as a controller and/or processor for the load 117. The data processing system 120 is configured to determine a control mode, select a modulation mode, and determine a plurality of terminal phase voltages of the machine based on the control mode. Modulation mode may refer to pulse width modulation (PWM), square wave, triangular wave, or sine wave, or the frequency, duty cycle or dead time associated with any of the foregoing. Control mode may be one of a voltage control mode and a frequency control mode, for example.

The data processing system 120 is coupled to the inverter circuit 188. The inverter circuit 188 may be a three-phase inverter. The inverter circuit 188 includes a semiconductor drive circuit that drives or controls switching semiconductors (e.g., insulated gate bipolar transistors (IGBT) or other power transistors) to output control signals for the load 117. In turn, the inverter circuit 188 is coupled to the load 117.

In an example embodiment, a voltage command generation module 105 is configured to receive a user command $U_{CMD}$ from a user, a mode select signal SEL from the user, an estimated machine terminal voltage $V_{term}$ and secondary limits $Limit_{AC\_Sec}$. The user command $U_{CMD}$ and the mode select signal SEL may be received over a vehicle data bus 118. The voltage command generation module 105 is configured to generate a voltage command $V_{CMD}$ based on the user command $U_{CMD}$, the mode select signal SEL, the estimated machine terminal voltage and the secondary limits. The user command $U_{CMD}$ indicates a desired voltage in the voltage control mode or a desired frequency to voltage relationship in frequency control mode. The mode select signal SEL indicates one of a voltage control mode and a frequency control mode.

A frequency command generation module 110 is configured to generate a frequency command $F_{CMD}$ based on the user command $U_{CMD}$ and the mode select signal SEL.

As shown in FIG. 1, the voltage command $V_{CMD}$ and the frequency command $F_{CMD}$ are fed to the vehicle data bus 118 for monitoring.

The current regulation limiter 111 is capable of communicating with the frequency command generation module 110. The current regulation limiter 111 receives respective final d-q axis current commands (e.g., $i_d^*$ and $i_q^*$) and actual d-q axis currents (e.g., $i_d$ and $i_q$). The d-q axis current refers to the direct axis current and the quadrature axis current as applicable in the context of vector-controlled alternating current machines, such as the load 117. While the term current command is used, it should be understood that current command refers to a target current value.

The current regulation limiter 111 generates a current limit VHz_Curr_Limit from the actual d-q axis currents. The current limit VHz_Curr_Limit represents a slewed final current limit command. The current regulation limiter 111 limits the up-ramp rate and down-ramp rate of the current limit. When up-ramp rate of a maximum current limit or a minimum current limit is greater than an up-ramp rate set point, the current limit ramp rate will be limited as the value of the up-ramp rate set point. When the down-ramp rate of a maximum current limit or the minimum current limit is greater than a down-ramp rate set point, the current limit ramp rate will be limited as the value of the down-ramp rate set point.

In an example embodiment, the PWM generation module 112 provides pulse commands for control of the inverter circuit 188 and provides duty ratios $d_a$, $d_b$, $d_c$ for each phase (a, b and c) of the inverter circuit 188 to a terminal voltage estimation module 127. The processing system 120 determines the three phase duty ratios $d_a$, $d_b$ and $d_c$, as described in U.S. application Ser. No. 14/141,631, entitled Methods of Determining Machine Terminal Voltage and Systems thereof, the entire contents of which are hereby incorporated by reference.

Then, based on voltage commands $V_\alpha$ and $V_\beta$, the duty ratios, deadtime, and PWM carrier waveform, the PWM pulses are created by the PWM generation module 112 and sent to the inverter circuit 188. The three phase duties $d_a$, $d_b$, $d_c$ are sent to the terminal voltage estimation module 127. Outputs of the PWM generation module 112 are coupled to an inverter circuit 188. The output stage of the inverter circuit 188 (e.g., output present phase voltages $V_{AN\_actual}$, $V_{BN\_actual}$ and $V_{CN\_actual}$) actual provides a pulse-width modulated voltage waveform or other voltage signal for control of the load 117. The voltages $V_{AN}$, $V_{BN}$ and $V_{CN}$ may be referred to as phase voltages, current control step voltages or present control step voltages, for example. In an example embodiment, the inverter circuit 188 is powered by a direct current (dc) voltage bus.

The inverter circuit 188 includes a semiconductor drive circuit that drives or controls switching semiconductors (e.g., insulated gate bipolar transistors (IGBT) or other power transistors) to output control signals for the load 117. In turn, the inverter circuit 188 is coupled to the load 117. A sensor (e.g., a position sensor, a resolver or encoder position sensor) may be associated with a motor shaft or the rotor of the motor. The sensor and the load 117 are coupled to the data processing system 120 to provide feedback data (e.g., current feedback data, such as phase current values ia, ib and ic), raw position signals, among other possible feedback data or signals, for example. Other possible feedback data includes, but is not limited to, winding temperature readings, semiconductor temperature readings of the inverter circuit 188, three phase voltage data, or other thermal or performance information for the load 117.

The position processing module 114 determines a position θ based on the frequency command $F_{CMD}$ as:

$$\theta = \int \omega_{cmd} dt \qquad (1)$$

where θ is the position data, $\omega_{CMD}$ is the frequency command, and dt is the sampling rate of the processing system 120.

Position data θ for the load 117 is communicated from the position processing module 114 to the phase converter 121 (e.g., two-phase to two-phase inverse Park transformation module) that converts the voltage command $V_{CMD}$ from d-q voltage commands into voltage commands $V_\alpha$ and $V_\beta$ for the PWM module 112.

An input of a sensing circuit 124 is coupled to terminals of the load 117 for sensing at least the measured three-phase currents and a voltage level of the direct current (dc) bus (e.g., high voltage dc bus which may provide dc power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 which outputs a measured dc bus voltage Vdc, temperature of phase windings Tp, IGBT temperature Tig and measured three phase currents is, ib and ic. The sensing circuit 124 is associated with the load 117 for measuring the three phase currents (e.g., current applied to the windings of the load 117, back EMF (electromotive force) induced into the windings, or both).

Certain outputs of the position processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data ia, ib and ic from the secondary processing module 116 and position data θ from the position processing module 114. The output of the phase converter 113 module ($i_d$, $i_q$) is coupled to the current regulation limiter 111.

Based off of the three phase duties ratios $d_a$, $d_b$, $d_c$, the PWM carrier waveform generated by the PWM generation module 112, and phase currents $i_a$, $i_b$ and $i_c$, a machine terminal voltage estimation module 127 estimates the inverter present phase voltages $V_{AN}$, $V_{BN}$, and $V_{CN}$ of the actual inverter output voltages $V_{AN\_actual}$, $V_{BN\_actual}$ and $V_{CN\_actual}$. Then the estimated inverter output voltages $V_{AN}$, $V_{BN}$, and $V_{CN}$ are used by the machine terminal voltage estimation module 127 to calculate the estimated machine terminal voltage. Comparing the estimated terminal voltage with a terminal voltage limit will create an error sent to a PI controller to create and adjust the controller direct axis (d-axis) current and eventually adjust quadrature-axis (q-axis) current.

Figure 2:
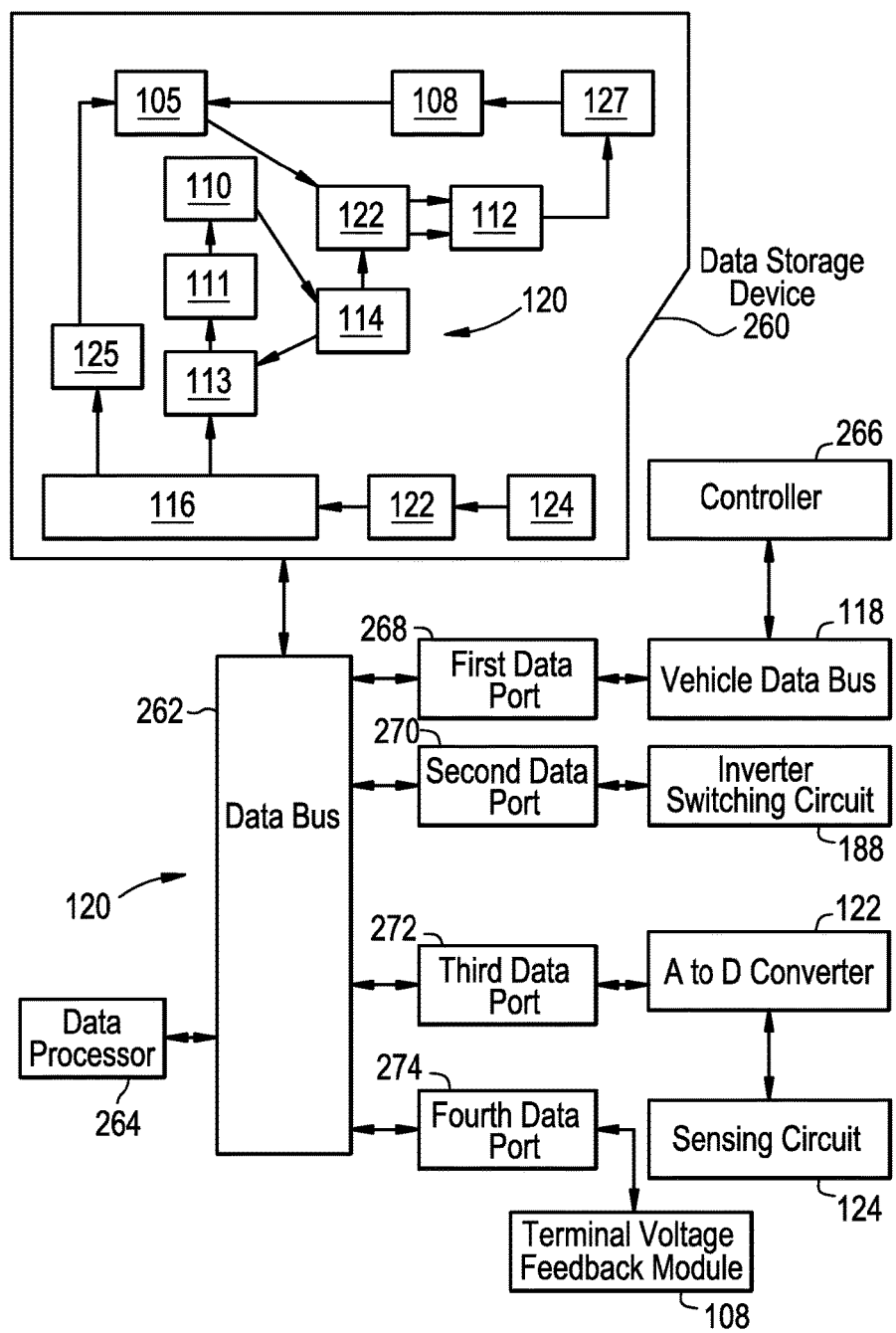

FIG. 2 is a block diagram of an electronic data processing system consistent with FIGS. 1A-1B, according to an example embodiment. In FIG. 2, the electronic data processing system 120 includes an electronic data processor 264, a data bus 262, a data storage device 260, and one or more data ports (268, 270, 272 and 274). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

As shown in FIG. 2, the data ports include a first data port 268, a second data port 270, a third data port 272 and a fourth data port 274, although any suitable number of data ports may be used. Each data port may include a transceiver and buffer memory, for example. In an example embodiment, each data port may include any serial or parallel input/output port.

In an example embodiment as illustrated in FIG. 2, the first data port 268 is coupled to the vehicle data bus 118. In turn, the vehicle data bus 118 is coupled to a controller 266. In one configuration, the second data port 270 may be coupled to the inverter circuit 188; the third data port 272 may be coupled to the analog-to-digital converter 122; and the fourth data port 274 may be coupled to the terminal voltage feedback module 108. The analog-to-digital converter 122 is coupled to the sensing circuit 124.

In an example embodiment of the data processing system 120, the torque command generation module 105 is associated with or supported by the first data port 268 of the electronic data processing system 120. The first data port 268 may be coupled to the vehicle data bus 118, such as a controller area network (CAN) data bus. The vehicle data bus 118 may provide data bus messages with voltage and frequency commands to the voltage command generation module 105 and the frequency command generation module 110. A user may generate the voltage commands via a user interface, the controller 266, or other control devices.

In some example embodiments, the primary processing module 114 may be associated with or supported by a port of the data processing system 120.

The data processor 264 may be specifically programmed to execute the voltage command generation module 105, the frequency command generation module 110, the current regulation limiter 111, the PWM generation module, the phase converter 113, the position processing module 114, the secondary processing module 116, the secondary limiters 125, the terminal voltage feedback module 108 and the machine terminal voltage estimation module 127.

The load 117 may be any type of electric drive devices, such as alternating current (AC) induction motors used to power systems such as hybrid/electrical vehicles. As discussed above, the drive device may have several parameters, based on which the drive device operates. Two such parameters are the rotor time constant and the magnetizing inductance. In order to better understand the operation of the drive device and the above two parameters, a few concepts and variables will be defined and described below.

Hereinafter, the example embodiments will be described with reference to an induction motor, as one type of drive device. However, the example embodiments are not limited to induction motors and may be equally applied to other types of drive devices as well.

An induction motor is an asynchronous motor including a stator and a rotor. An induction motor relies on a small difference in speed between the stator rotating magnetic field and the rotor shaft speed called slip to induce rotor current in the rotor AC winding. The difference between the rotor's synchronous speed (i.e., synchronous with the stator speed) and an actual speed of the rotor is called slip. The slip is a unit-less value or may alternatively be expressed as a slip frequency. The concept of slip frequency and an adjustment thereof will be described in detail, below.

Figure 3A:
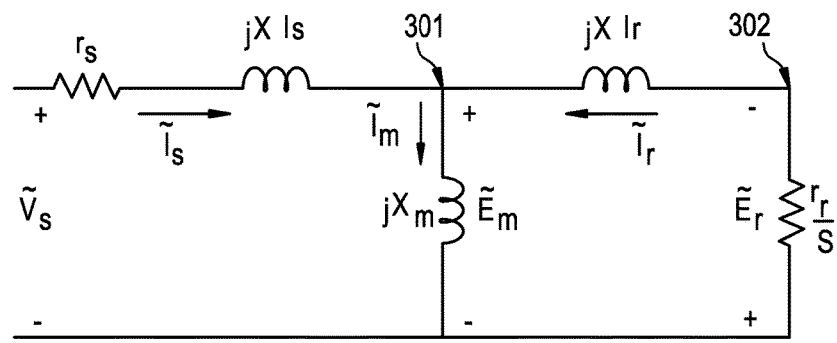
FIGS. 3A-3B illustrate circuit equivalents of an induction motor, according to one example embodiment.
Figure 3B:
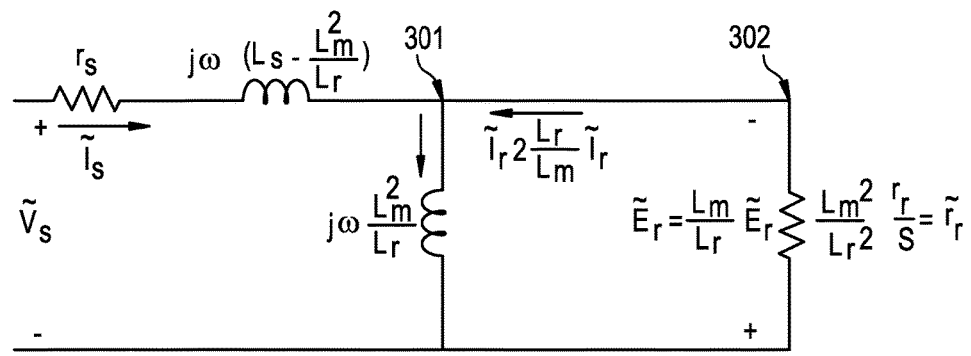

FIGS. 3A-3B illustrate circuit equivalents of an induction motor, according to one example embodiment. FIG. 3A illustrates a general equivalent circuit of an induction motor, according to one example embodiment. FIG. 3B illustrates a steady-state equivalent circuit of the induction motor, according to one example embodiment.

An induction motor has, among other parts, a stator and a rotor. In FIG. 3A, the induction motor's equivalent circuit has a magnetizing branch 301 and a rotor branch 302. Moreover, $\tilde{V}_s$ is the stator's voltage, $r_s$ is the stator's resistance, $jX_{ls}$ is the stator's leakage reactance, $jX_{lr}$ is the rotor's leakage reactance, $jX_m$ is the magnetizing reactance, $\tilde{I}_s$ is the stator's current, $\tilde{I}_r$ is the rotor's current, $\tilde{E}_m$ is the voltage across the magnetizing branch 301, $\tilde{E}_r$ is the rotor's voltage across the rotor resistance in the rotor branch 302 is represented as $$\frac{r_r}{s},$$

where S represents the slip.

A steady-state equivalent circuit of an induction motor may be obtained using a referral ratio α. In one example embodiment, and in order to perform torque analysis for the induction motor, the referral ratio α may be chosen such that the rotor's winding reactance $jX_{lr}$ in the rotor branch 302 is zero. In particular, the referral ratio α may be chosen according to the following formula.

$$\alpha = \frac{L_m}{L_r} \tag{2}$$

where $L_m$ is the magnetizing inductance and $L_r$ is the induction motor's rotor inductance.

FIG. 3B, illustrates the equivalent steady-state circuit the induction motor's equivalent circuit of the induction motor, when the referral ratio α is applied to the general equivalent circuit of FIG. 3A.

In FIG. 3B, $\overline{V}_s$ is the steady-state voltage applied at a stator of the induction motor, $\overline{I}_s$ is the steady-state current at the stator of the induction motor, $r_s$ is the stator resistance, $L_s$ is the magnetizing inductance, $L_m$ is the magnetizing inductance, $L_r$ is the induction motor's rotor inductance, $\overline{I}_r$ is the rotor's steady-state current, $\overline{E}_r$ is the steady-state voltage across the rotor and $$\frac{r_r}{s}$$

represents tree rotor's resistance, with S being the slip.

A comparison between FIG. 3A and FIG. 3B illustrates that in the equivalent steady-state circuit of the induction motor shown in FIG. 3B, the current through the rotor branch 302, $\overline{I}_r$, is $$\frac{L_r}{L_m}$$

times the rotor current $\tilde{I}_r$ of the general circuit, the steady-state voltage $\overline{E}_r$ is $$\frac{L_m}{L_r}$$

times the rotor voltage $\tilde{E}_r$ of the general circuit and the steady-state rotor resistance $$\frac{\overline{r}_r}{s}$$

is $$\frac{L_m^2}{L_r^2}$$

times the rotor resistance $$\frac{r_r}{s}$$

of the general circuit.

Moreover, the comparison illustrates that the stator's leakage reactance $jX_{ls}$ is represented by the expression $$j\omega\left(L_s - \frac{L_m^2}{L_r}\right),$$

where $\omega$ is the stator's frequency, $L_s$ is the total stator's inductance, $L_m$ is the magnetizing inductance and $L_r$ is the total rotor's inductance.

The steady state current $\bar{I}_s$, as shown in FIG. 3B, may be divided into two components. The first component is the current that flows through the magnetizing branch 301, which controls the rotor flux, hence represented by $I_{s\varphi}$. The second component is the current flowing through the steady state rotor resistance $r_r$, which controls the induction motor's torque, hence represented by $I_{sT}$.

In one example embodiment, the relationship between the current flowing through the magnetizing branch $I_{s\varphi}$ and the current flowing the rotor's resistance, $I_{sT}$, is given by the following relationship.

$$I_{sT} = j\frac{L_r}{r_r} * \omega_{slip} * I_{s\varphi} \quad (3)$$

where $\omega_{slip}$ is a slip frequency and the remaining variables of equation (3) are as described above.

From equation (3), the slip frequency may be determined by equation (5), as shown below.

$$\omega_{slip} = \frac{r_r * I_{sT}}{L_r * I_{s\varphi}} \quad (4)$$

As described above, two examples of machine parameters are a rotor time constant and a magnetizing inductance of the drive device. During normal operation of the drive device, such machine parameters change from their initial values, which can adversely affect the performance of the drive device.

The rotor time constant is defined by the following equation.

$$\tau_r = \frac{L_r}{r_r} \quad (5)$$

where $\tau_r$ is the rotor time constant and $L_r = L_m + L_{lr}$, with $L_r$ being the rotor inductance and the $r_r$ being the rotor resistance, $L_m$ being the magnetizing inductance and $L_{lr}$ being the rotor leakage inductance.

The rotor resistance $r_r$ may change with temperature of the rotor, which made adversely affect the rotor time constant. Furthermore, given the relationship between $L_r$ and $L_m$, the magnetizing inductance also affects the rotor time constant $\tau_r$.

Changes in the rotor resistance $r_r$ and the magnetizing inductance $L_m$ may introduce errors in the rotor flux position and may establish magnetizing current. The rotor flux is important for indirect field oriented control of the induction motor.

In one example embodiment and in direct field orientation control of the induction motor, the rotor flux may be aligned with the d-axis. Therefore, due to changes in the rotor flux, in the indirect field oriented control of the induction motor, the controller estimated d-axis and q-axis currents would not be aligned with the true d-axis and q-axis currents. This in turn will result in the induction motor operating in a detuned state.

Operation of the induction motor in a detuned state may result in the steady-state torque value being different from the commanded torque value, non-instantaneous torque, machine losses and possible reduction in the peak motor torque available at the inverter current limit as well as an error in the rotor flux position, which is the synchronous position of the rotor.

In order to address the problem of the induction motor operating in a detuned state, in example embodiments described below, auto-tuning of the magnetizing inductance $L_m$ and the slip frequency $\omega_{slip}$, in real-time will be described so as to remedy the deficiencies in the performance of the induction motor in the detuned state.

As described above, one of the parameters that affect the performance of the induction motor is the rotor's time constant. In one example embodiment and in order to compensate for changes in the rotor's time constant, the slip frequency $\omega_{slip}$ is adjusted (tuned), as will be described below.

In one example embodiment, the processor 264 may determine the synchronous position of the rotor. In doing so, the processor 264, using the sensing circuit 124, determines a rotor's actual position $\theta_r$. Thereafter, the processor 264 adds an estimate of slip frequency to the determined actual position of the rotor. The calculated slip frequency is an estimate of the actual slip frequency of the motor since the actual rotor resistance and inductance values are not known to the processor 264. Accordingly, the determined synchronous position by the processor 264 is an estimate of the actual synchronous position of the rotor flux.

In one example embodiment, the processor 264 utilizes the estimated synchronous position of the rotor flux in performing the Park Transformation discussed above. However, because the controller estimated synchronous position is different from the actual synchronous position, the controller estimated d-axis/q-axis position differs from the machine d-axis/q-axis. In other words, the d-axis/q-axis position, determined by the processor 264 is different from the actual (e.g., true) d-axis/q-axis position.

Figure 4:
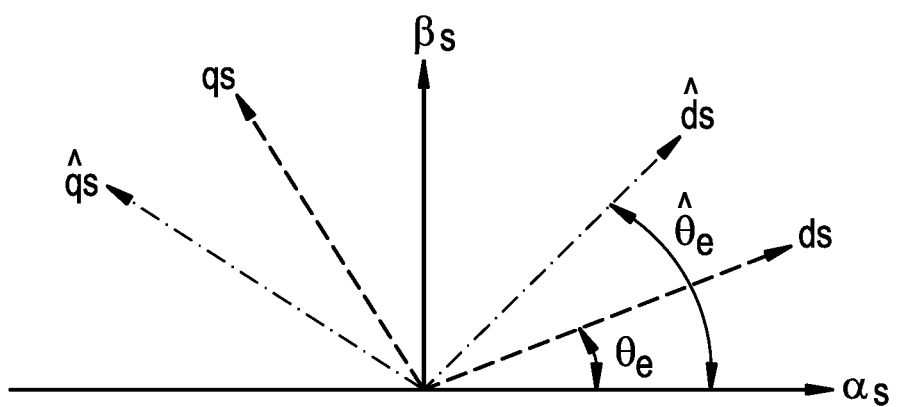

FIG. 4 is a graph illustrating the difference between the determined d-axis/q-axis and the actual d-axis/q-axis positions, according to one example embodiment. As illustrated in FIG. 4, $\theta_e$ represents the actual d-axis/q-axis position (shown using the dashed-lines) while $\hat{\theta}_e$ represented the estimated d-axis/q-axis position (shown using the dotted-lines), as determined by the processor 264.

As can be seen from FIG. 4, and as described above, $\hat{\theta}_e$ and $\theta_e$ are different, which indicates that the induction motor is in a detuned state. The difference between $\hat{\theta}_e$ and $\theta_e$ may be represented by $$\tilde{\theta}_e = \theta_e - \hat{\theta}_e \quad (6)$$

From FIG. 4 and using equation (6), it follows that the d-axis current and the q-axis current may be represented by:

$$\hat{i}_{dqs} = e^{\pm j\tilde{\theta}_e} i_{\alpha\beta s} \quad (7)$$

$$i_{dqs} = e^{\pm j\hat{\theta}_e *} \hat{i}_{qds} \quad (8)$$

where "^" associated with $i_{qds}$ represents $i_{qds}$, as determined/estimated by the processor 264.

From equations (7) and (8), the processor 164 may determine the d-axis and q-axis currents using equations (9) and (10), shown below.

$$i_{ds} = \hat{i}_{ds} \cos \tilde{\theta}_{e^*} + \hat{i}_{qs} \sin \tilde{\theta}_{e^*} \quad (9)$$

$$i_{qs} = -\hat{i}_{ds} \sin \tilde{\theta}_{e^*} + \hat{i}_{qs} \cos \tilde{\theta}_{e^*} \quad (10)$$

From the above determination and in the detuned state, the processor 264 ensures that determined stator d-axis current $i_{ds}$ and the determined stator q-axis current $i_{qs}$ match. Accordingly, the processor 264 may determine inaccurate d-axis voltage $V_{d\text{-}cmd}$ and $V_{q\text{-}cmd}$ and q-axis voltage commands, which are then pulse width modulated and sent to the inverter 188. Inaccurate d-axis voltage $V_{d\text{-}cmd}$ and $V_{q\text{-}cmd}$, may in turn adversely affect the machine terminal voltage.

What is described above illustrates how an inaccurate estimation of the estimated slip frequency, may adversely affect the determination of the stator's d-axis current $i_{ds}$ and the stator's q-axis current $i_{qs}$, which may in turn affect the d-axis voltage command $V_{d\text{-}cmd}$ and q-axis voltage command $V_{q\text{-}cmd}$.

In one example embodiment and in order to compensate for the difference in the actual slip frequency and the slip frequency determined by the processor 264, the processor 264, in real-time, analyzes two values of the d-axis voltage, obtained via different methods, as will be described below. The discrepancy between the two values of the d-axis voltage is then used by the processor 264, to determine an adjustment value for the slip frequency, with which the slip frequency value is then adjusted and controlled so as to address the deficiencies described above when an inaccurate estimate of the slip frequency is used by the processor 264.

Figure 5:
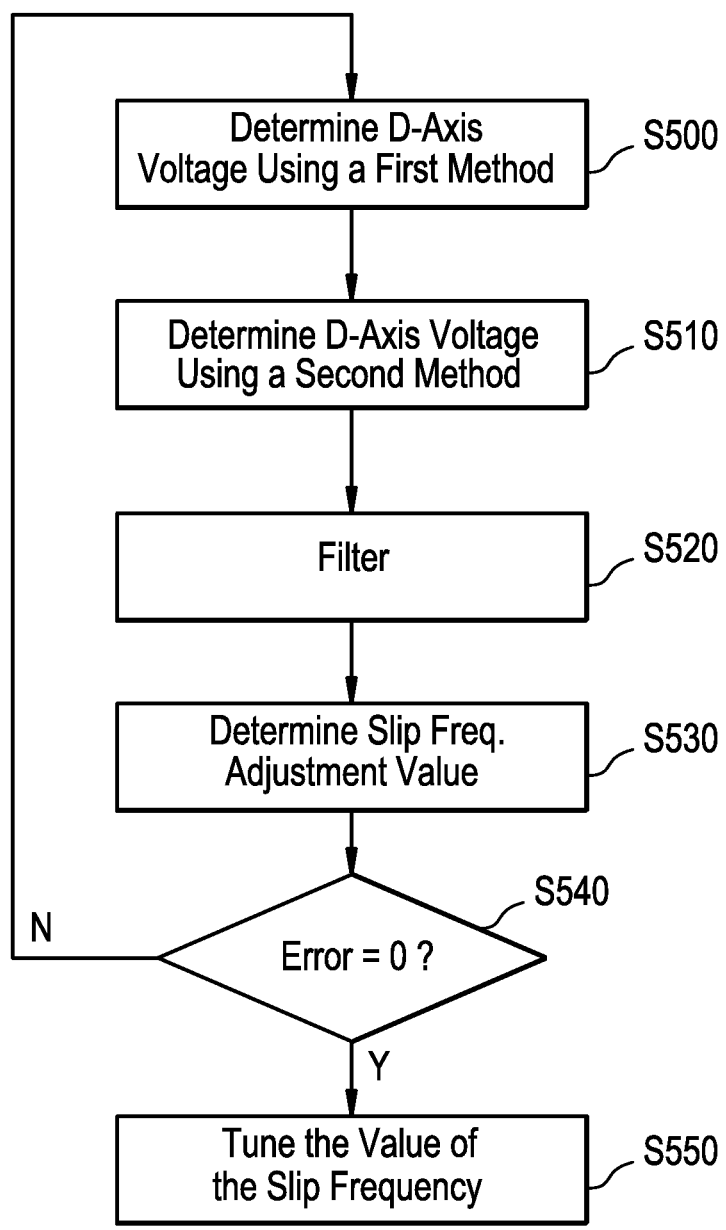

FIG. 5 describes a method for tuning an induction motor's slip frequency in real time, according to one example embodiment.

At S500, the processor 264 determines the d-axis voltage using a first method. In one example embodiment and according to the first method, the processor 264 determines the d-axis voltage based on a terminal voltage estimation method. The terminal voltage estimation method may be any known or to be developed method for estimating the induction motor's terminal voltages $V_{ds}$ and $V_{qs}$.

According to one example embodiment of such voltage estimation method, voltages $V_\alpha$ and $V_\beta$ at the output of the phase inverter 112 shown in FIG. 1A, are determined. The determined $V_\alpha$ and $V_\beta$ are then transformed to determine the stator's d-axis voltage $V_{ds}$ and the stator q-axis voltage $V_{qs}$ based on an estimate of the d-axis/q-axis position represented by $\theta_v$. In one example embodiment, in each duty cycle k, $\theta_v(k)$ is equal to $\theta_e(k-1)$, with $\theta_e(k)$ given by, $$\theta_e(k) = \theta_r(k) + f\omega_{slip} \quad (11)$$

where $\theta_r(k)$ is the rotor's actual position known to the processor 264 from feedback data provided by the sensing circuit 124.

In one example embodiment, the processor 264 may execute the instructions for estimating the machine terminal voltage as provided in the machine terminal voltage estimation module 127 in FIG. 1A.

As can be seen from equation (11), the stator terminal d-axis voltage $V_{ds}$ estimated using the first method depends on the slip frequency $\omega_{slip}$.

At S510, the processor 264 determines the stator's d-axis voltage according to a second method. In one example embodiment and according to the second method, the processor 264 determines the d-axis voltage from the stator's voltage equation under steady-state conditions. In other words, the processor 264 observes (e.g., measures) the d-axis voltage using the stator's voltage equation under steady-state conditions. In particular, the stator's d-axis voltage under steady state conditions is given by equation (12) shown below.

$$V_{ds} = i_{ds} * r_s - \omega_e * \sigma * L_s * i_{qs} \text{ where } \sigma = \left(1 - \frac{L_m^2}{L_s * L_r}\right) \quad (12)$$

where $V_{ds}$ is the stator's d-axis voltage, $i_{ds}$ is the stator's d-axis current, $r_s$ is the stator's resistance that is temperature compensated, $\omega_e$ is the induction motor's synchronous speed, which in one example embodiment is a sum of the rotor's speed $\omega_r$ and the slip frequency $\omega_{slip}$, $L_s$ is the stator's inductance and $L_m$ is the magnetizing inductance.

In equation (12), because the d-axis voltage is not a function of rotor's time constant $\tau_r$ and $\sigma$ is small, changes in the d-axis voltage of the stator is insensitive to changes in $\omega_e$ due to variations in $\omega_{slip}$. In other words, the stator's d-axis voltage $V_{ds}$ determined using the second method, is independent of the slip frequency $\omega_{slip}$.

The stator's q-axis voltage $V_{qs}$ does not depend on $\sigma$ and thus $V_{ds}$, alone may be used to adjust the value of $\omega_{slip}$.

At S520, the processor 264 uses a moving average filter to filter the stator's d-axis voltage values $V_{ds}$ determined using the first and second methods at S500 and S510.

At S530, the processor 264 determines the slip frequency $\omega_{slip}$ adjustment value. In one example embodiment, the processor 264 may determine the slip frequency $\omega_{slip}$ adjustment value, as follows.

The processor 264 may determine the slip frequency $\omega_{slip}$ adjustment value as an output of a proportional-integral (PI) controller that results in the filtered stator d-axis voltage, determined using the first method at S500 to be equal to the filtered stator d-axis voltage determined using the second method at S510.

At S540, the processor 264 determines whether an error between the values of the filtered stator d-axis voltages determined using the first and second methods at S500 and S510, is zero.

If at S540, the processor 264 determines that the error is not zero, the process may revert back to S500 and the processor 264 may repeat S500 to S540 and may continuously adjust the output of the PI controller in order to keep the error between the stator d-axis voltages determined using the first and second methods zero (i.e., the error between estimated d-axis/q-axis position and the true d-axis/q-axis position, zero, thus aligning the two).

However, if at S540, the processor 264 determines that the error is zero, then at S550, the processor 264 controls/tunes the estimated slip frequency $\omega_{slip}$ using the slip frequency $\omega_{slip}$ adjustment value at S530. In one example embodiment, the processor 264 controls/tunes the estimated slip frequency $\omega_{slip}$ by subtracting/adding the slip frequency $\omega_{slip}$ adjustment value from/to the estimated slip frequency $\omega_{slip}$.

In one example embodiment, the processor 264 determines whether the induction motor is in operating mode or a generating mode, which determines the whether the speed of the rotor is positive or negative. Accordingly, the processor 264 applies the appropriate sign (e.g., positive or negative) of the rotor speed to the slip frequency $\omega_{slip}$ adjustment value. Thereafter, the processor 264 adjusts (e.g., subtracts) the estimated slip frequency $\omega_{slip}$ value with the slip frequency $\omega_{slip}$ adjustment value having the corrected sign that corresponds to the motoring or generating state of the induction motor.

Applying the sign of the rotor's speed in either the motoring state or the generating state is shown in FIG. 6. FIG. 6 illustrates a table of applying the adjustment value of a rotor's slip frequency to the estimated value of the slip frequency, according to one example embodiment.

For example and as shown in FIG. 6, in a motoring state, the speed of the rotor is −2000 revolutions per minute (RPM), the estimated slip frequency $\omega_{slip}$ value is −1.87 and the determined slip frequency $\omega_{slip}$ adjustment value is 0.02. Accordingly, because the speed sign of the rotor's speed is negative, the slip frequency $\omega_{slip}$ adjustment value is multiplied by −1 and the result is subtracted from −1.87, which provides a $\omega_{slip}$ control value of −1.85.

The process of FIG. 5 is performed by the processor 264 in real time and at every given (or alternatively, predetermined) time interval, where the time interval for performing the method of FIG. 5 is a design parameter determined based on empirical studies and may be specified/preprogrammed into the processor 264 by a system operator.

Given the following relationship between the value of the slip frequency and the rotor time constant, controlling the value of the slip frequency $\omega_{slip}$, as discussed above, results in controlling the value of the rotor time constant.

$$\omega_{slip} = \frac{1}{\tau_r} * \frac{i_{qs}}{i_{ds}} \qquad (13)$$

$$\text{where } \tau_r = \frac{L_r}{r_r}.$$

Aside from tuning the value of slip frequency $\omega_{slip}$, in real time, the processor 264 may further tune the value of the magnetizing inductance in real time as well.

In one example embodiment, the processor 264 tunes the value of the magnetizing inductance $L_m$ by estimating the actual electromagnetic torque of the induction motor and comparing the estimated torque to the electromagnetic torque command provided to the induction motor.

In one example embodiment, the processor 264 may estimate the actual torque of the induction motor by determining the machine terminal power (actual power of the induction motor) in a stationary reference frame, compensating for the stator and rotor copper losses and then determining the mechanical power of the induction motor. The estimate torque is then determined by dividing the mechanical power by the rotor's mechanical speed. This example embodiment will be described below with reference to FIG. 7.

Figure 7:
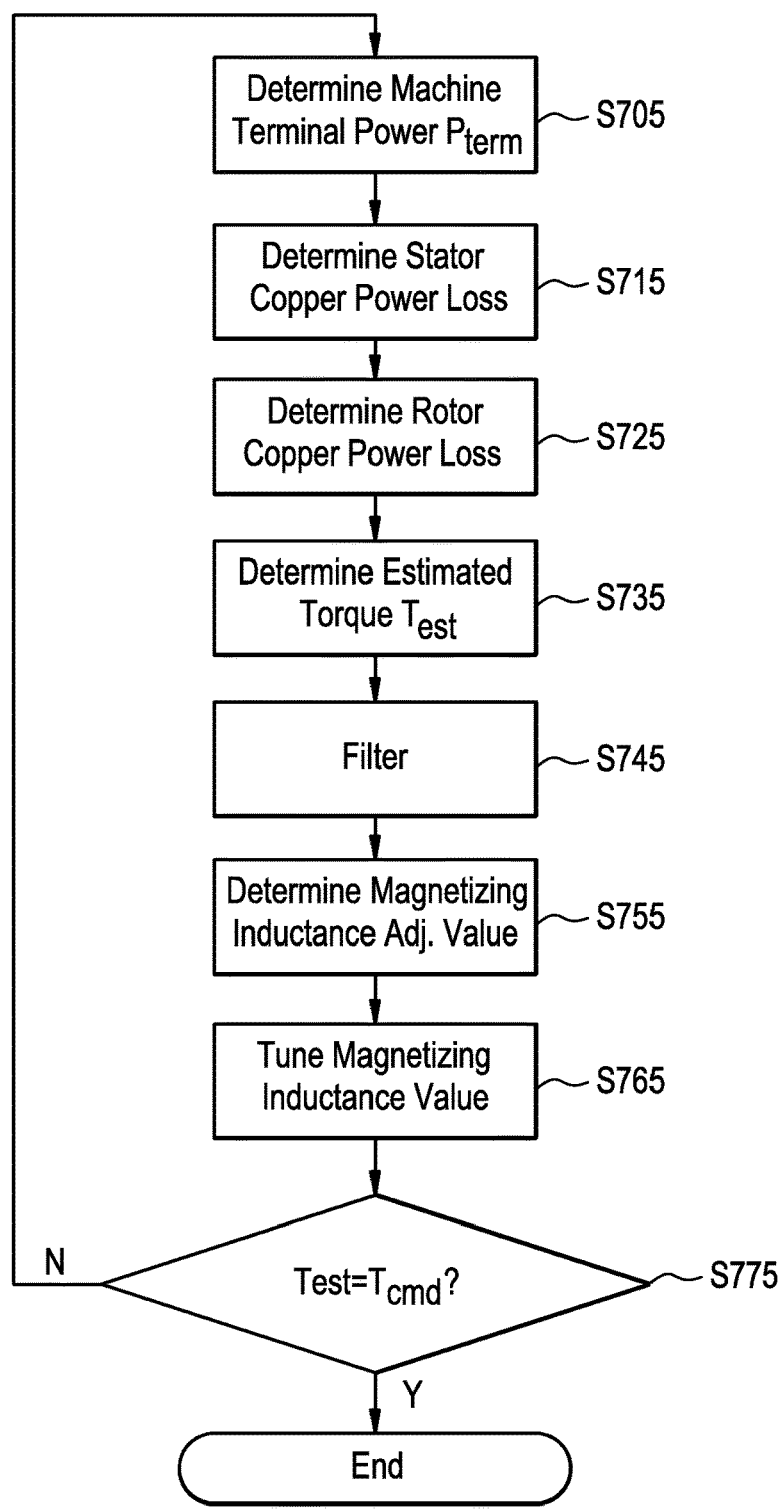
FIG. 7 illustrates a method of tuning a magnetizing inductance of an induction motor, according to one example embodiment.

FIG. 7 illustrates a method of tuning a magnetizing inductance of an induction motor, according to one example embodiment.

At S705, the processor 264 may determine the machine terminal power $P_{term}$, according to the following equation.

$$P_{term} = \frac{3}{2} * (V_{\beta s} * i_{\beta s} + V_{\alpha s} * i_{\alpha s}) \qquad (14)$$

where $V_{\beta s}$ and $V_{\alpha s}$ are machine terminal voltages in the stationary reference frame, which in one example embodiment are estimated using any known terminal voltage estimation method. Furthermore, $i_{\beta s}$ and $i_{\alpha s}$ are machine currents, which in one example embodiment are derived from the d-axis current $I_d$ and q-axis current $I_q$ transformed using the true d-axis/q-axis position of a previous duty cycle, denoted by an estimate of the d-axis/q-axis position represented by $\theta_v$, as described above.

In one example embodiment, instead of estimating the actual torque of the induction motor by determining the machine terminal power in a stationary reference frame, the processor 264 may estimate the actual torque of the induction motor by determining the machine terminal power in a synchronous reference frame. Accordingly, instead of Eq. (14), the processor 264 may determine the machine power $P_{term}$ using the following equation.

$$P_{term} = \frac{3}{2} * (V_{ds} * I_{ds} + V_{qs} * I_{qs}) \qquad (15)$$

Thereafter, at S715, the processor 264 may determine the amount of power loss associated with the stator copper. In one example embodiment, the processor 264 may determine the stator copper power loss using the following equation.

$$P_{scu} = \frac{3}{2} * I_s^2 * R_{sTwndg} \qquad (16)$$

where $I_s$ is the stator's current and $R_{sTwndg}$ is given by $$R_{sTwndg} = \frac{R_{25C} * (K + T_{wndg})}{(25 + K)} \qquad (17)$$

where K=234.5 for copper and 225 for aluminum, $R_{25C}$ is a fixed value which may be determined based on empirical studies/laboratory measurements and $T_{wndg}$ is the real-time temperature of the rotor winding as measured by the processor 264 using, for example, the sensing circuit 124 shown in FIG. 1B.

Thereafter, at S725, the processor 264 may determine power loss associated with the rotor copper. In one example embodiment, the processor 264 may determine the rotor copper power loss using the following equation.

$$P_{rcu} = \frac{3}{2} * I_{qr}^2 * r_r \qquad (18)$$

where $r_r$ is the adjusted value of the rotor resistance and $I_{qr}$ is the rotor's q-axis current. Rotor's d-axis current $I_{dr}$ is zero in steady-state operation of the induction motor.

Based on equation (13), $r_r$ may be rewritten as $$r_r = \frac{L_r * i_{ds} * \omega_{slip}}{i_{qs}} \qquad (19)$$

where $\omega_{slip}$ is the tuned value of the slip frequency determined at S540.

The rotor's q-axis current $I_{qr}$ in equation (18) may be determined by the processor 264 as follows. The q-axis rotor flux is given by:

$$\lambda_{qr} = L_m * i_{qs} * L_r * i_{qr} \qquad (20)$$

where, in one example embodiment, the rotor flux $\lambda_{qr}$ is zero for field oriented condition. Therefore, the rotor's q-axis current $i_{qr}$ may be written as:

$$i_{qr} = \left(-\frac{L_m}{L_r}\right) * i_{qs} \quad (21)$$

Substituting equations (19) and (21) into equation (18) results in the following equation (22) for determining the power loss associated with the rotor's copper.

$$P_{rcu} = \frac{3}{2} * \frac{L_m^2}{L_r} * i_{qs} * i_{ds} * \omega_{slip} \quad (22)$$

Substituting the following equations (23) and (24) into equation (22), the processor 264 may determine the value of power loss in the rotor's copper, using equation (25).

$$K_T = \frac{3}{2} * \frac{P}{2} * \frac{L_m^2}{L_r} \quad (23)$$

$$i_{qs} = \frac{T_{cmd}}{i_{ds} * K_T} \quad (24)$$

$$P_{rcu} = \frac{2}{P} * T_{cmd} * \omega_{slip} \quad (25)$$

where $T_{cmd}$ is the commanded torque value.

At S735, the processor 264 determines an estimated value of the torque $T_{est}$. In one example embodiment, the processor 264 may determine the estimated value of the torque $T_{est}$, as follows.

As indicated above, the processor 264 may determine the mechanical power as the machine terminal power adjusted by the power loss in the stator copper and the rotor copper. Accordingly, the processor 264 may determine the mechanical power of the induction motor according to the following equation.

$$P_{mech} = P_{term} - P_{scu} - P_{rcu} \quad (26)$$

Thereafter, the processor 264 determines the estimated torque $T_{est}$ as:

$$T_{est} = \frac{P_{mech}}{\omega_r} \quad (27)$$

where $\omega_r$ is the rotor's mechanical speed, which may be accurately measured using sensors such as the sensing circuit 124 shown in FIG. 1 or may alternatively be estimated by the processor 264 using any known methods.

The processor 264 determines the estimated torque $T_{est}$ by substituting equations (14) or (15) as well as equations (16) and (25) into equation (26) and thereafter substituting the determined mechanical power $P_{mech}$ into equation (27).

In one example embodiment, machine terminal power $P_{term}$ is either positive or negative depending on whether the induction motor is in a motoring or a generating state. Accordingly, the stator and rotor copper power losses ($P_{scu}$ and $P_{rcu}$) may be subtracted from the machine terminal power $P_{term}$ is equation (26) when the induction motor is in a motoring state. Alternatively, when the induction motor is in a generating state, the stator and rotor cupper losses may be added to the machine terminal power $P_{term}$. results in the mechanical power.

As can be seen from the above, the estimated torque $T_{est}$ depends on the value of the magnetizing inductance $L_m$.

Thereafter, at S745, the processor 264 may filter the estimated torque $T_{est}$ using, for example, a moving average filter.

At S755, the processor 264, determines an adjustment value for the magnetizing inductance $L_m$. In one example embodiment and in determining the adjustment value for the magnetizing inductance $L_m$, the processor 264 compares the filtered $T_{est}$ with the commanded torque $T_{cmd}$. The difference between the two torque values $T_{est}$ and $T_{cmd}$ is fed by the processor 264 into a PI controller, which drives the difference to zero. The output of the PI controller, which results in the different between the estimated torque $T_{est}$ and the commanded torque $T_{cmd}$ to be zero, is then used by the processor 264 as the adjustment value for the magnetizing inductance $L_m$.

At S765, the processor 264 tunes a value of the magnetizing inductance $L_m$, known to the processor 264 using the adjustment value determined at S755.

In one example embodiment, the known value of the magnetizing inductance $L_m$, may be provided in a look-up table (LUT), which may have been pre-programmed into the controller data storage device 260. The LUT may be a table of values that indicate various values of the magnetizing inductance versus the d-axis current $I_d$. The d-axis current reference $I_d$ may be determined in real-time based on the operating point of the machine that include constant torque, constant power, constant power multiplied by the machine's speed) In one example embodiment, if the estimated torque $T_{est}$ is less than the commanded torque $T_{cmd}$, the processor 264 reduces the known value of the magnetizing inductance $L_m$ by an amount equivalent to the adjustment value determined at S755. In one example embodiment, if the estimated torque $T_{est}$ is greater than the commanded torque $T_{cmd}$, the processor 264 increases the value of the known magnetizing inductance $L_m$ by an amount equivalent to the adjustment value determined at S755.

AT S775, the processor 264 determines whether the tuned magnetizing inductance determined at S765 results in the value of the estimated torque $T_{est}$ being equal to the value of the commanded torque $T_{cmd}$. If at S775, the processor 264 determines that the tuned magnetizing inductance determined at S765 is different from the value of the commanded torque $T_{cmd}$, the process reverts back to S705 and the processor 264 repeats S705 to S765 until the values of the estimated torque $T_{est}$ and the commanded torque $T_{cmd}$, are equal (i.e., the ratio between the values of the estimated torque $T_{est}$ and the commanded torque $T_{cmd}$ is 1).

However, if at S755, the processor 264 determines that the tuned magnetizing inductance determined at S765 is equal to the value of the commanded torque $T_{cmd}$, then the process ends. Accordingly, the processor 264 may use the tuned value of the magnetizing inductance in determining control signals for driving the induction motor.

In one example embodiment, depending on whether the induction motor is in operating mode or a generating mode, the processor 264 applies the appropriate sign (positive or negative) of the rotor speed to the magnetizing inductance adjustment value. Thereafter, the processor 264 adjusts (e.g., subtracts/adds) the magnetizing inductance value, which has been modified to have the corrected sign that corresponding to the motoring or generating state of the induction motor, to the estimated value of the magnetizing inductance $L_m$.

Applying the sign of the rotor's speed in either the motoring state or the generating state is shown in FIG. 8. FIG. 8 illustrates a table of applying the adjustment value of a rotor's magnetizing inductance to the value of the magnetizing inductance, according to one example embodiment.

For example and as shown in FIG. 8, in a motoring state the speed of the rotor is −2000 rounds per minute (RPM), the known value of the magnetizing inductance $L_m$ (via the LUT table) may be 2.4 and the determined magnetizing inductance adjustment value determined at S755 is 0.1. Accordingly, because the torque sign of the rotor's torque is negative, the magnetizing inductance adjustment value is multiplied by −1 and the result is subtracted from 2.4, which provides a tuned magnetizing inductance control value of 2.3.

While with reference to FIG. 7, an example embodiment for determining the estimating torque $T_{est}$ is provided, any currently known or to be developed method for determining $T_{est}$, may be utilized by the processor 264.

For example and as an alternative to the above described method for determining $T_{est}$, the processor 264 may determine $T_{est}$ by first estimating the stator flux $\lambda_{\beta s}$ and $\lambda_{\alpha s}$ and thereafter using the estimated stator flux to determine $T_{est}$. The processor 264 may determine the stator's flux using equations (26) and (27) shown below and thereafter applying the determined $\lambda_{\beta s}$ and $\lambda_{\alpha s}$ to equation (28) to determine $T_{est}$.

$$\lambda_{\alpha s} = \int V_{\alpha s} - (i_{\alpha s} - r_s) \cdot dt \tag{28}$$

$$\lambda_{\beta s} = \int V_{\beta s} - (i_{\beta s} * r_s) \cdot dt \tag{29}$$

$$T_{est} = \frac{3}{2} * \frac{P}{2} * (\lambda_{\alpha s} * i_{\beta s} - \lambda_{\beta s} * i_{\alpha s}) \tag{30}$$

In one example embodiment, the processor 264 may carry the tuning of the slip frequency $\omega_{slip}$ and the magnetizing inductance $L_m$ simultaneously.

In one example embodiment, the processor 264 may execute instructions to enable/disable auto tuning of the slip frequency $\omega_{slip}$ and the magnetizing inductance $L_m$. For example, there may be a unified auto-tuning enable flag logic programmed and stored on the data storage device 260 shown in FIG. 2. In one example embodiment, the processor 264 may execute the unified auto-tuning enable flag logic. When the flag is high, the processor 264 may enable the auto-tuning of both the slip frequency $\omega_{slip}$ and the magnetizing inductance $L_m$. When the flag is low, the processor 264 may input an error of zero to the auto-tuning PI for the slip frequency $\omega_{slip}$ and the magnetizing inductance $L_m$, thus forcing the auto-tuning PI compensator to retain its last slip frequency $\omega_{slip}$ and the magnetizing inductance $L_m$, values prior to the auto-tuning processes being turned off.

Once the tuned values of the slip frequency and the magnetizing inductance are determined, the processor 264 may utilize the tuned values of the slip frequency and the magnetizing inductance in determining control signals for controlling the induction motor.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method comprising:
   determining a first adjustment value for a slip frequency of a rotor in an induction motor based on a direct-axis voltage of the induction motor determined using a first method and a second method,
      the first method including determining the direct-axis voltage as an estimate of a direct-axis terminal voltage command,
      the second method including determining the direct-axis voltage as an observed direct-axis voltage of a stator in the induction motor, and
      the first adjustment value being determined based on a difference between the estimate of the direct-axis terminal voltage command and the observed direct-axis voltage of the stator;
   tuning the slip frequency of the rotor based on the first adjustment value;
   estimating an electromagnetic torque of the induction motor by,
      determining a terminal power of the induction motor,
      estimating a stator power loss value,
      estimating a rotor power loss value based on a torque command and the tuned slip frequency,
      determining a mechanical power of the induction motor by adjusting the terminal power to compensate for the estimated stator power loss value and the estimated rotor power loss value, and
      determining the estimated electromagnetic torque based on the mechanical power of the induction motor and a mechanical speed of the rotor;
   determining a second adjustment value for a magnetizing inductance of the induction motor based on a difference between the estimated electromagnetic torque of the induction motor and the torque command;
   tuning the magnetizing inductance of the induction motor based on the second adjustment value; and
   driving the induction motor based on the tuned slip frequency and the tuned magnetizing inductance.

2. The method of claim 1, wherein the determining of the first adjustment value and the second adjustment value and the tuning of the slip frequency and the magnetizing inductance are performed in real-time.

3. The method of claim 1, wherein the observed direct-axis voltage of the stator is independent of variations in the slip frequency.

4. The method of claim 1, wherein when the tuning tunes the slip frequency by the first adjustment value, a ratio between the direct-axis voltage determined using the first method and the direct-axis voltage determined using the second method, is equal to 1.

5. The method of claim 1, wherein when the tuning tunes the magnetizing inductance of the induction motor by the second adjustment value, a ratio between the torque command and the estimated electromagnetic torque, is equal to 1.

6. A device comprising:
   a memory configured to store computer-readable instructions thereon; and
   a processor configured to execute the computer-readable instructions to,
      determine a first adjustment value for a slip frequency of a rotor in an induction motor based on a direct-axis voltage of the induction motor determined using a first method and a second method, the first method including determining the direct-axis voltage as an estimate of a direct-axis terminal voltage command, the second method including determining the direct-axis voltage as an observed direct-axis voltage of a stator in the induction motor, and the first adjustment value being determined based on a difference between the estimate of the direct-axis terminal voltage command and the observed direct-axis voltage of the stator, tune the slip frequency of the rotor based on the first adjustment value, estimate an electromagnetic torque of the induction motor by, determining a terminal power of the induction motor, estimating a stator power loss value, estimating a rotor power loss value based on a torque command and the tuned slip frequency, determining a mechanical power of the induction motor by adjusting the terminal power to compensate for the estimated stator power loss value and the estimated rotor power loss value, and determining the estimated electromagnetic torque based on the mechanical power of the induction motor and a mechanical speed of the rotor, determine a second adjustment value for a magnetizing inductance of the induction motor based on a difference between the estimated electromagnetic torque of the induction motor and the torque command, tune the magnetizing inductance of the induction motor based on the second adjustment value, and drive the induction motor based on the tuned slip frequency and the tuned magnetizing inductance.

7. The device of claim 6, wherein the processor is configured to, determine the first adjustment value and the second adjustment value in real-time, and tune the slip frequency and the magnetizing inductance of the induction motor in real-time.

8. The device of claim 6, wherein the observed direct-axis voltage of the stator is independent of variations in the slip frequency.

9. The device of claim 6, wherein when the processor tunes the slip frequency by the first adjustment value, a ratio between the direct-axis voltage determined using the first method and the direct-axis voltage determined using the second method, is equal to 1.

10. The device of claim 6, wherein when the processor tunes the magnetizing inductance of the induction motor by the second adjustment value, a ratio between the torque command and the estimated electromagnetic torque, is equal to 1.

* * * * *